United States Patent
Cheng (10) Patent No.: US 9,855,523 B2
(45) Date of Patent: Jan. 2, 2018

(54) SMOKE FILTER (71) Applicant: Chieh-Yuan Cheng, Taichung (TW)

(72) Inventor: Chieh-Yuan Cheng, Taichung (TW)

(*) Notice: Subject to any disclaimer, the term of this patent is extended or adjusted under 35 U.S.C. 154(b) by 272 days.

(21) Appl. No.: 14/965,032

(22) Filed: Dec. 10, 2015

(65) Prior Publication Data
US 2017/0165599 A1 Jun. 15, 2017

(51) Int. Cl.
| | |
|---|---|
| *B01D 46/00* | (2006.01) |
| *B01D 46/18* | (2006.01) |
| *B01D 46/44* | (2006.01) |
| *B01D 39/08* | (2006.01) |

(52) U.S. Cl.
CPC ............ *B01D 46/18* (2013.01); *B01D 39/08* (2013.01); *B01D 46/185* (2013.01); *B01D 46/44* (2013.01); *B01D 2239/06* (2013.01)

(58) Field of Classification Search
CPC .... B01D 39/08; B01D 46/44; B01D 2279/35; B01D 2239/06; B01D 46/20; B01D 46/22; B01D 46/0005; B01D 46/0056
See application file for complete search history.

(56) References Cited

U.S. PATENT DOCUMENTS

| | | | | |
|---|---|---|---|---|
| 1,933,635 A * | 11/1933 | Meyer | .................... | B01D 46/18 55/354 |
| 3,252,691 A * | 5/1966 | Getzin | .................... | B01D 46/18 198/494 |
| 3,296,780 A * | 1/1967 | Revell | .................... | B01D 46/18 210/387 |
| 3,398,511 A * | 8/1968 | Gustavsson | ............ | B01D 46/18 55/290 |
| 3,706,378 A * | 12/1972 | Markwick | ............ | B01D 29/096 210/107 |
| 4,378,980 A * | 4/1983 | Long | .................. | B01D 46/0032 55/354 |
| 4,405,342 A * | 9/1983 | Bergman | ................ | B03C 3/155 55/352 |
| 5,217,513 A * | 6/1993 | Armbruster | ............ | B01D 46/18 55/351 |
| 5,234,481 A * | 8/1993 | Jardinier | ................ | B01D 46/18 55/352 |
| 5,819,139 A * | 10/1998 | Harlan | .................... | G03G 21/16 312/332.1 |
| 6,206,203 B1 * | 3/2001 | Hopkins | ................ | B01D 17/00 210/205 |
| 6,571,959 B1 * | 6/2003 | Moore | .................... | B01D 33/15 210/167.09 |
| 2005/0178734 A1 * | 8/2005 | Kilmer | ................. | B01D 29/096 210/791 |
| 2017/0136393 A1 * | 5/2017 | Strain | .................... | B01D 33/04 |

* cited by examiner

*Primary Examiner* — Amber R Orlando
*Assistant Examiner* — Britanny Precht
(74) *Attorney, Agent, or Firm* — Ming Chow; Sinorica, LLC (57) ABSTRACT

A smoke filter includes a housing formed with an upper casing and a lower casing. A filtration passage with a bending section is formed between the upper casing and the lower casing and further, a replaceable filtration cloth device is provided in the interior of the housing and the filtration cloth of the replaceable filtration device passes through the filtration passage. By so designing, the smoke filter of this invention is able to increase a filtration area, enhance filtration efficiency and diminish the size of the housing and further, the smoke filter of this invention is simple in structure and convenient in maintenance and in replacement of the filtration cloth.

10 Claims, 7 Drawing Sheets

SMOKE FILTER

BACKGROUND OF THE INVENTION

1. Field of the Invention

This invention relates to a smoke filter, particularly to one that is able to effectively dispose of the smoke and the ashes produced by electric welding.

2. Description of the Prior Art

A commonly seen metal welding plant of argon welding, electric welding and heat treatment is easy to produce a large quantity of smoke during electric welding processing. The smoke produced by electric welding frequently contains heavy metal volatile matter, and when an operator is exposed in a working environment full of electric welding smoke, the operator will be unavoidable to inhale too much heavy metal contained in the electric welding smoke, thus not only polluting an environment of operation but endangering the operator's health as well. Therefore, an air filter specially used for electric welding is developed used. The conventional air filter, referring to FIG. 1, includes a housing 1 having one top end bored with a through opening 2 and its interior separately provided with an upper accommodating chamber 3 and a lower accommodating chamber 4. The upper accommodating chamber 3 communicates with the through opening 2 and has its interior orderly and downward installed with a spark-ash obstruction device 5 and a movable filtration cloth device 6, which is provided with filtration cloth 7 able to be rotated properly, and further, the lower accommodating chamber 4 has its interior installed with a blower 8. Thus, when the blower 8 is started to operate, air to be filtrated can be sucked in the housing 1 via the through opening 2 and then the air orderly passes through the spark-ash obstruction device 5, the movable filtration cloth device 6 and the blower 8 to be filtrated and then exhausted out.

Figure 1:
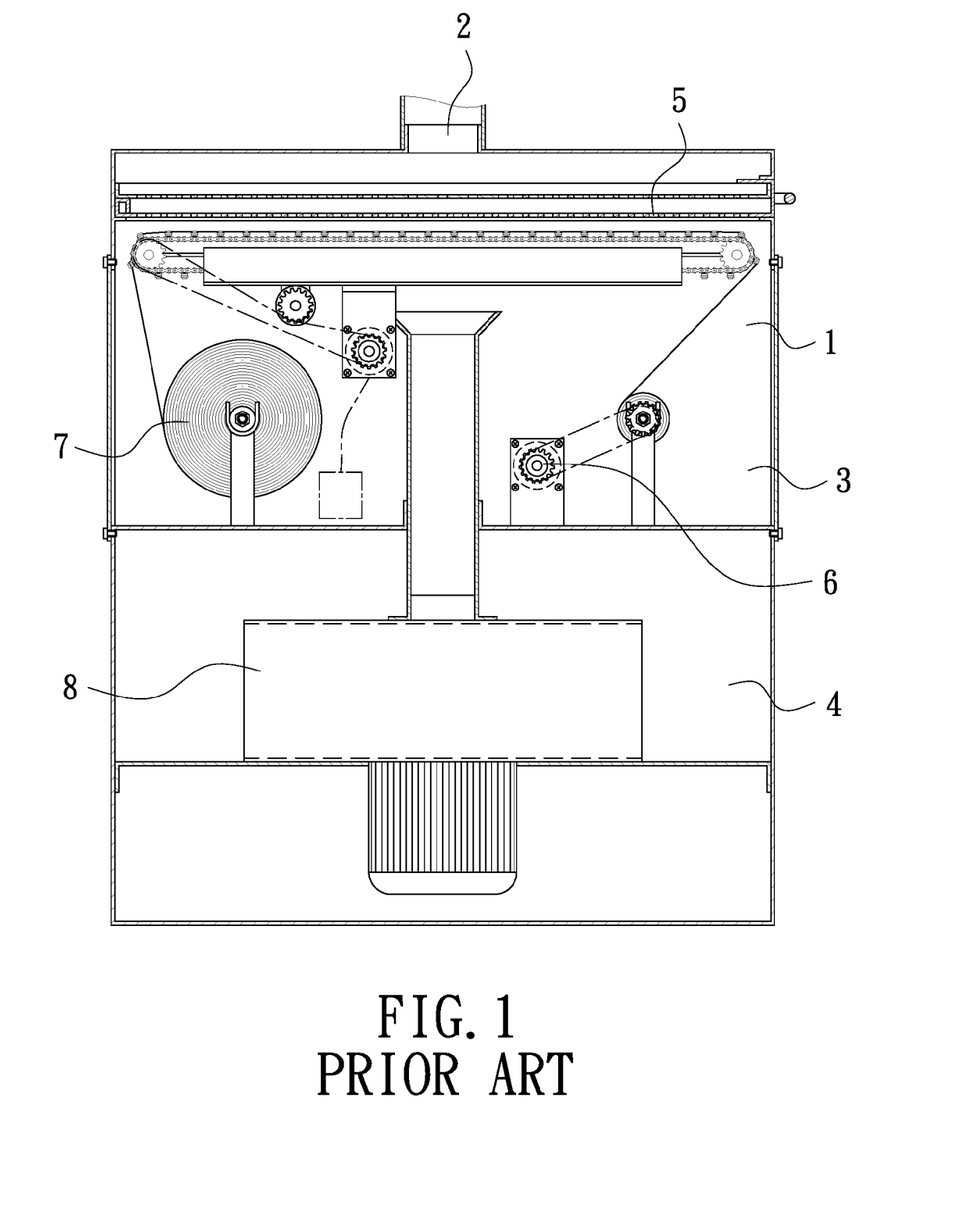
FIG. 1 is a sectional view of a conventional air filter.

However, the above-mentioned conventional air filter has the following shortcomings:

1. Since the interior members of the movable filtration device 6 is various and numerous; therefore, the filtration cloth 7 is hard to be replaced and easy to be damaged, and the movable filtration cloth device 6 has its interior members respectively distributed and provided in the housing 1, as shown in FIG. 1; therefore, when the movable filtration cloth device 6 is damaged, it is difficult in maintenance.

2. The filtration cloth 7 in the movable filtration cloth device 6 is received in the interior of the housing 1 and the movable filtration cloth device 6 has the filtration cloth 7 positioned horizontally for carrying out filtration; therefore, the filtration area of the filtration cloth 7 is too small and hence filtration is not sufficiently effective.

Therefore, after having observed foresaid defects, the inventor of this invention thinks that the conventional air filter is necessary to be ameliorated and then devises this invention.

SUMMARY OF THE INVENTION

The objective of this invention is to offer a smoke filter, which is formed with a large filtration area, able to effectively dispose of the smoke and the ashes produced by electric welding and convenient in replacement of filtration cloth and maintenance.

The smoke filter in the present invention includes a housing consisting of an upper casing and a lower casing. The upper casing has its interior formed with an upper accommodating chamber, its topside longitudinally provided with an air intake and its bottom side bored with a first opening. The lower casing has its interior formed with a lower accommodating chamber and its topside longitudinally bored with a second opening corresponding to the first opening of the upper casing and further has one side transversely disposed with an exhaust opening. The upper casing and the lower casing can be covered mutually and combined into one, letting the upper accommodating chamber communicate with the lower accommodating chamber via both the first opening and the second opening. A transverse filtration passage is formed between the upper casing and the lower casing of the housing, and the filtration passage stretches along both the first opening and the second opening. Further, the upper casing has a bottom side provided with a projecting portion protruding toward the lower casing and the lower casing is formed with a recessed portion corresponding to the projecting portion of the upper casing, and the projection portion and the recessed portion make a portion of the filtration passage form into a bending section. A replaceable filtration cloth device is composed of a paper conveying seat and a paper winding seat. The paper conveying seat is set at an outer side of one side of the lower accommodating chamber of the lower casing, and the paper winding seat corresponding to the paper conveying seat is set at an outer side of another side of the lower accommodating chamber of the lower casing. The paper conveying seat is mounted thereon with a roll of filtration cloth whose one is actuated to pass through the filtration passage between the upper casing and the lower casing and then connected to the upper winding seat. A blower is installed at a location of the exhaust opening of the lower casing, and a control device is positioned at one side of the housing and connected with the blower. The control device is provided with at least one driving motor, which is connected with the paper winding seat for turning the paper winding seat.

The smoke filter of this invention is to have the blower sucking the smoke and the ashes produced by electric welding into the housing and then, have the filtration cloth filtering out the smoke and the ashes, able to attain effect of causing no pollution during electric welding. Further, since the filtration cloth of the paper conveying seat passes through the bending section of the filtration passage; therefore, the bending section of the filtration passage has functions of increasing the filtration area of the filtration cloth and elevating filtration efficiency. Furthermore, the control device can timely rotate the paper winding seat to enable the filtration cloth to be automatically kept in a better filtering condition, and the paper conveying seat and the paper winding seat are respectively and independently positioned at two sides of the lower casing; therefore, the paper conveying seat and the paper winding seat can be respectively detached and disengaged from the housing. By so designing, compared with the conventional air filter, the smoke filter of this invention is simple in structure, convenient in maintenance and able to carry out filtration automatically, and has advantages of larger filtration area and higher filtration efficiency and efficacies of diminishing the size of the housing and facilitating detachment or replacement of the filtration cloth.

BRIEF DESCRIPTION OF DRAWINGS

This invention will be better understood by referring to the accompanying drawings, wherein.

DETAILED DESCRIPTION OF THE PREFERRED EMBODIMENT

Figure 2:
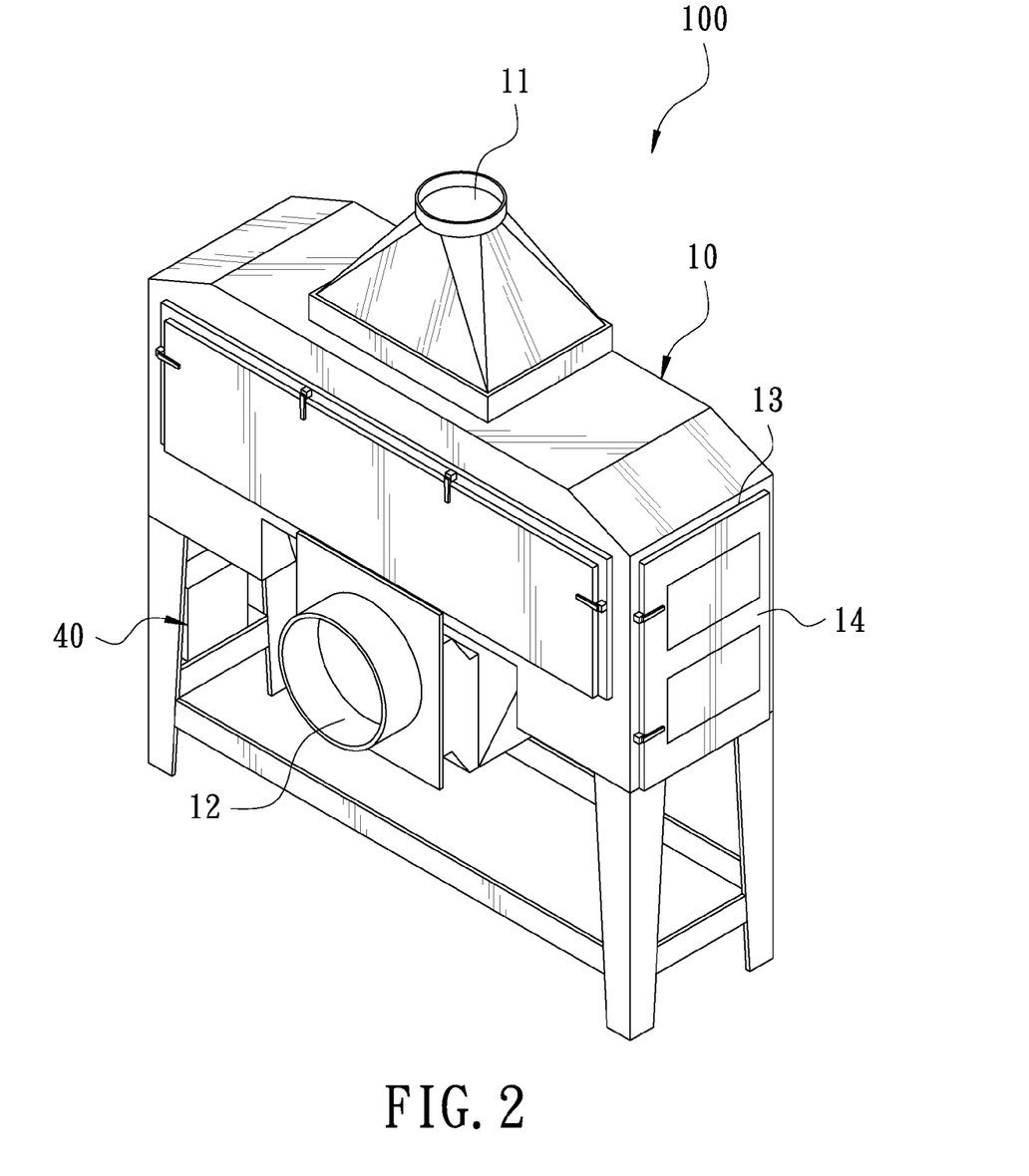
FIG. 2 is a perspective view of a preferred embodiment of a smoke filter in the present invention.
Figure 3:
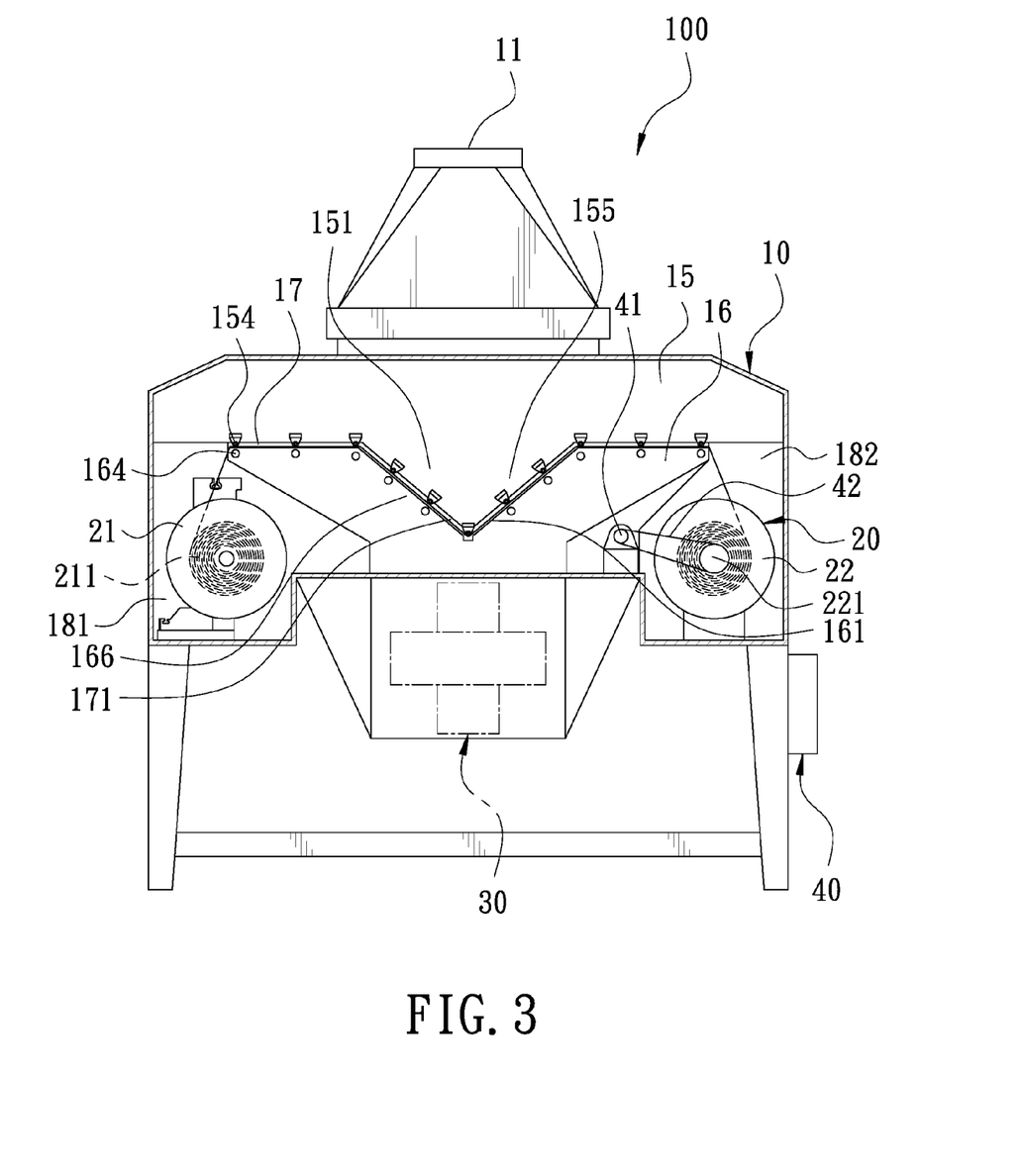
FIG. 3 is a front sectional view of the preferred embodiment of the smoke filter in the present invention, showing that a driving motor is connected with a paper winding seat by a driving belt.

A preferred embodiment of a smoke filter 100 in the present invention, as shown in FIGS. 2 and 3, includes a housing 10, a replaceable filtration cloth device 20, a blower 30 and a control device 40 as main components combined together.

Figure 5:
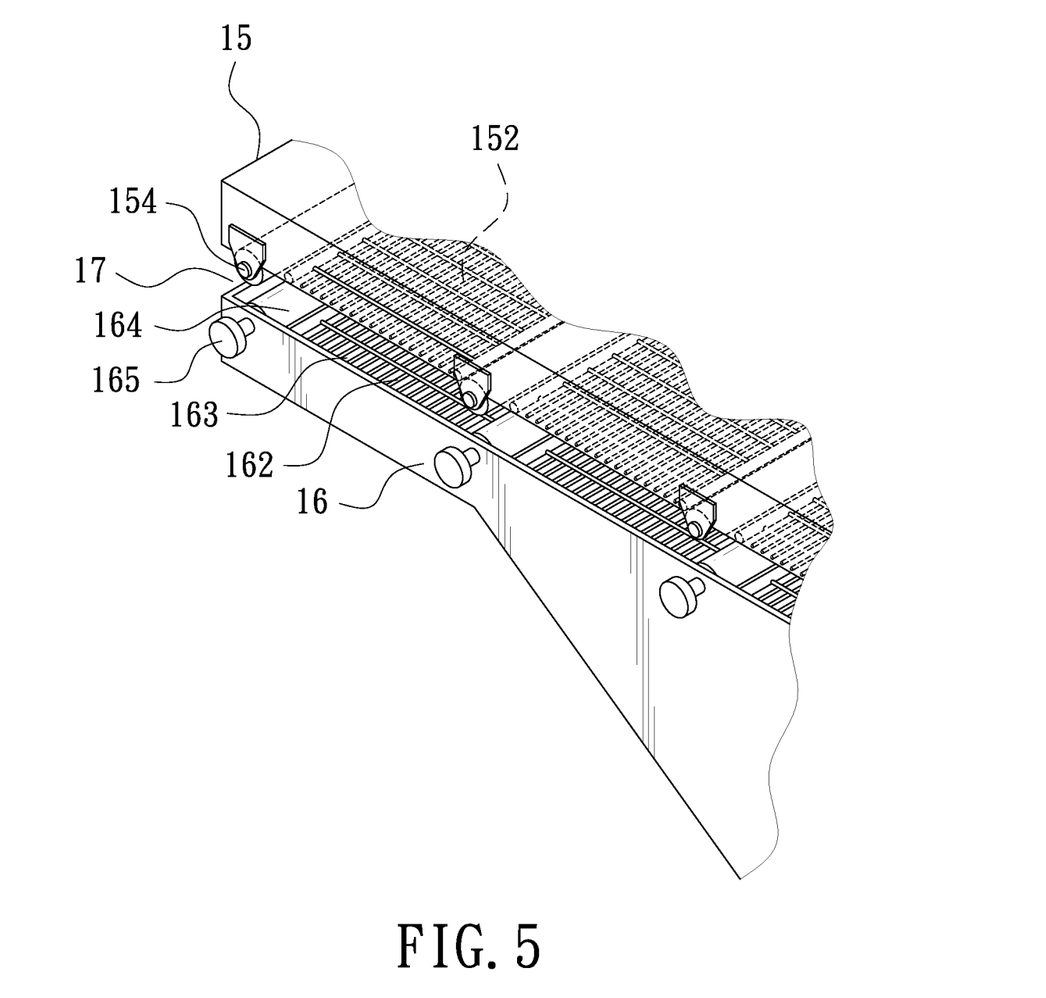
FIG. 5 is a partial magnified view of the preferred embodiment of the smoke filter in the present invention, showing a state of first ventilating net racks and first rotary shafts, and a state of second ventilating net racks and second rotary shafts.

The housing 10 consists of an upper casing 15 and a lower casing 16 combined together. The upper casing 15 has its interior formed with an upper accommodating chamber 153 and its topside longitudinally provided with an air intake 11, and the top portion of the housing 10, adjacent to the air intake 11, is gradually expanded downward. The upper casing 15 further has its bottom side longitudinally bored with a first opening 155, and the upper accommodating chamber 153 of the upper casing 15 is by degree expanded from the air intake 11 toward the first opening 155. The lower casing 16 has its interior formed with a lower accommodating chamber 163 and its topside longitudinally bored with a second opening 166 corresponding with the first opening 155 and further has one side transversely disposed with an exhaust opening 12. The lower accommodating chamber 163 of the lower casing 16 is gradually contracted from the second opening 166 toward the exhaust opening 12. The upper casing 15 and the lower casing 16 can be mutually covered and combined into one, letting the upper accommodating chamber 153 and the lower accommodating chamber 163 communicate with each other via the first opening 155 and the second opening 166. Further, a transverse filtration passage 17 is provided between the upper casing 15 and the lower casing 16 to stretch along the first opening 155 and the second opening 166. Furthermore, the upper casing 15 has its bottom side provided with a projecting portion 151 protruding toward the lower casing 16, and the lower casing 16 is formed with a recessed portion 161 at a location corresponding to the projecting portion 151 of the upper casing 15. Both the projecting portion 151 and the recessed portion 161 make the filtration passage 17 formed into a bending section 171, which is V-shaped. Moreover, the lower accommodating chamber 163 of the lower casing 16 has transverse two sides respectively disposed with a side chamber 181, 182 respectively formed with plural openings 13, which are pivotally mounted with a door plank 14 respectively. Referring to FIG. 5, the upper casing 15 has its bottom side provided with a plurality of first ventilating net racks 152, and the lower casing 16 has its topside provided with a plurality of second ventilating net racks 162 corresponding to the first ventilating net racks 152, and the filtration passage 17 is positioned between the first ventilating net racks 152 and the second ventilating net racks 162.

In addition, the upper casing 15 has its bottom side pivotally fixed with a plurality of first rotary shafts 154 spaced apart to have the first rotary shafts 154 respectively positioned at two sides of the first ventilating net racks 152, letting the first rotary shafts 151 and the first ventilating net racks 152 arranged interposing one another. The lower casing 16 is provided with a plurality of second rotary shafts 164 corresponding with the first rotary shafts 154, and the second rotary shafts 164 and the second ventilating net racks 162 are staggered in arrangement. The lower casing 16 further has its outer side provided with a plurality of gears 165, which are correspondingly connected with one end of the second rotary shafts 164.

Figure 7:
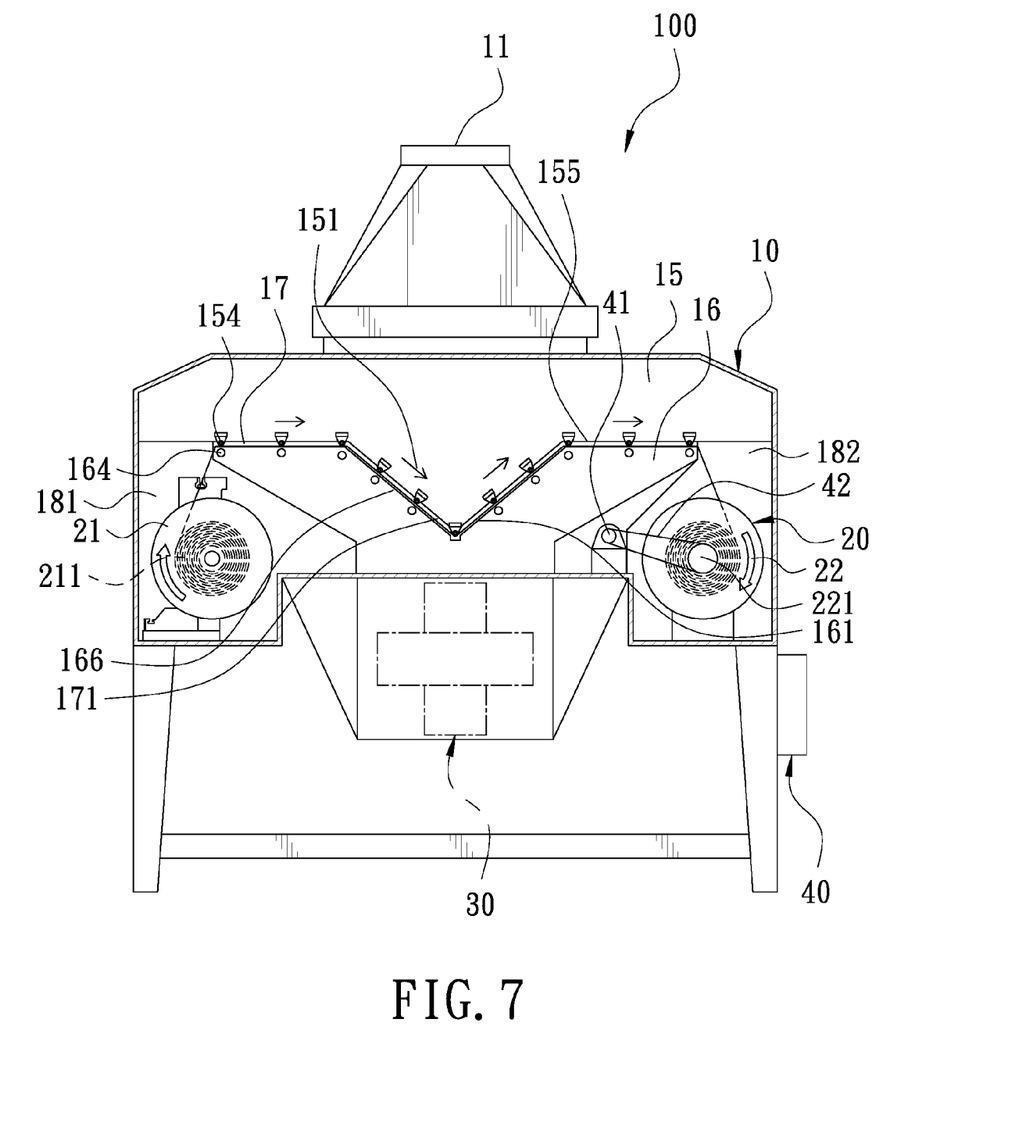
FIG. 7 is a schematic view of the preferred embodiment of the smoke filter in the present invention, showing a state that the driving motor drives the paper winding seat to rotate.

The replaceable filtration cloth device 20 is independently installed in the housing 10, composed of a paper conveying seat 21 and a paper winding seat 22. The paper conveying seat 21 is provided at an outer side of one side of the lower accommodating chamber 163 of the lower casing 16 and positioned in the side chamber 181, while the paper winding seat 22 corresponding to the paper conveying seat 12 is provided at an outer side of another side of the lower accommodating chamber 163 of the lower casing 16 and received in the side chamber 182. The paper conveying seat 12 is fixed thereon with a roll of filtration cloth 211 and the filtration cloth 211 has one end passing through the filtration passage 17 between the upper casing 15 and the lower casing 16 and then connected with the paper winding seat 22, as shown in FIG. 7. In this preferred embodiment, the paper winding seat 22 has one side secured with a rotary gear 221.

The blower 30 is installed in the lower accommodating chamber 163 of the lower casing 16 and connected with the exhaust opening 12.

Figure 4:
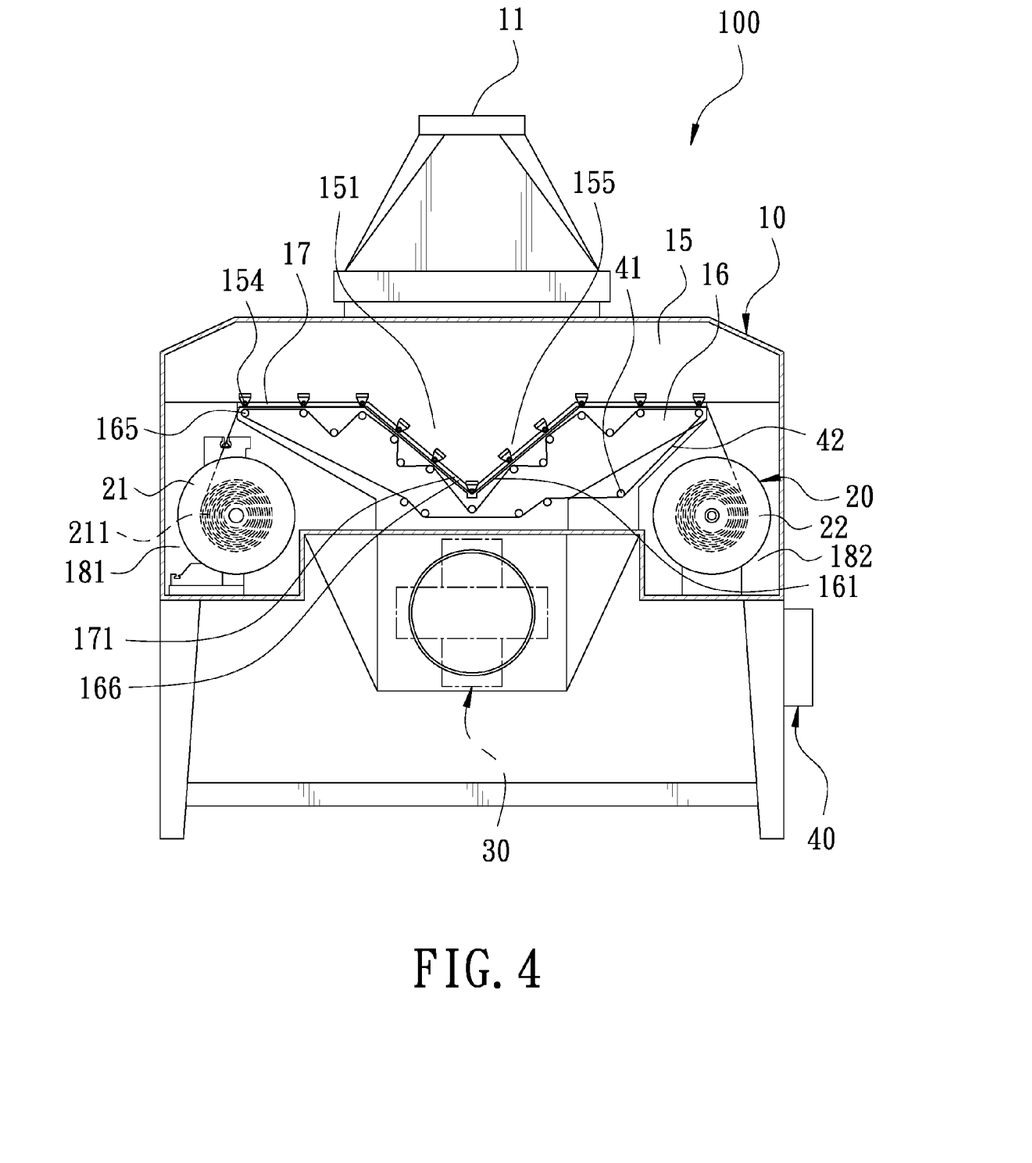
FIG. 4 is a rear sectional view of the preferred embodiment of the smoke filter in the present invention, showing that the driving motor is connected with gears by a driving belt.

The control device 40 with a timing function is set at one side of the housing 10 and connected with the blower 30, referring to FIGS. 3 and 4. The control device 40 has at least one driving motor 41 received in the housing 10 at a location adjacent to the paper winding seat 22 and connected with the paper winding seat 22 for rotating the paper winding seat 22. In the preferred embodiment, the control device 40 has two driving motors 41 installed at one side of the lower casing 16 and positioned between the lower casing 16 and the paper winding seat 22, and one of the two driving motors 41 is connected with the rotary gear 221 of the paper winding seat 22 by means of a driving belt 42 and another driving motor 41 is connected with the gears 165 by means of another driving belt 42. The driving belt 41 can be a chain or a belt and in this invention, a belt is used as an example.

Figure 6:
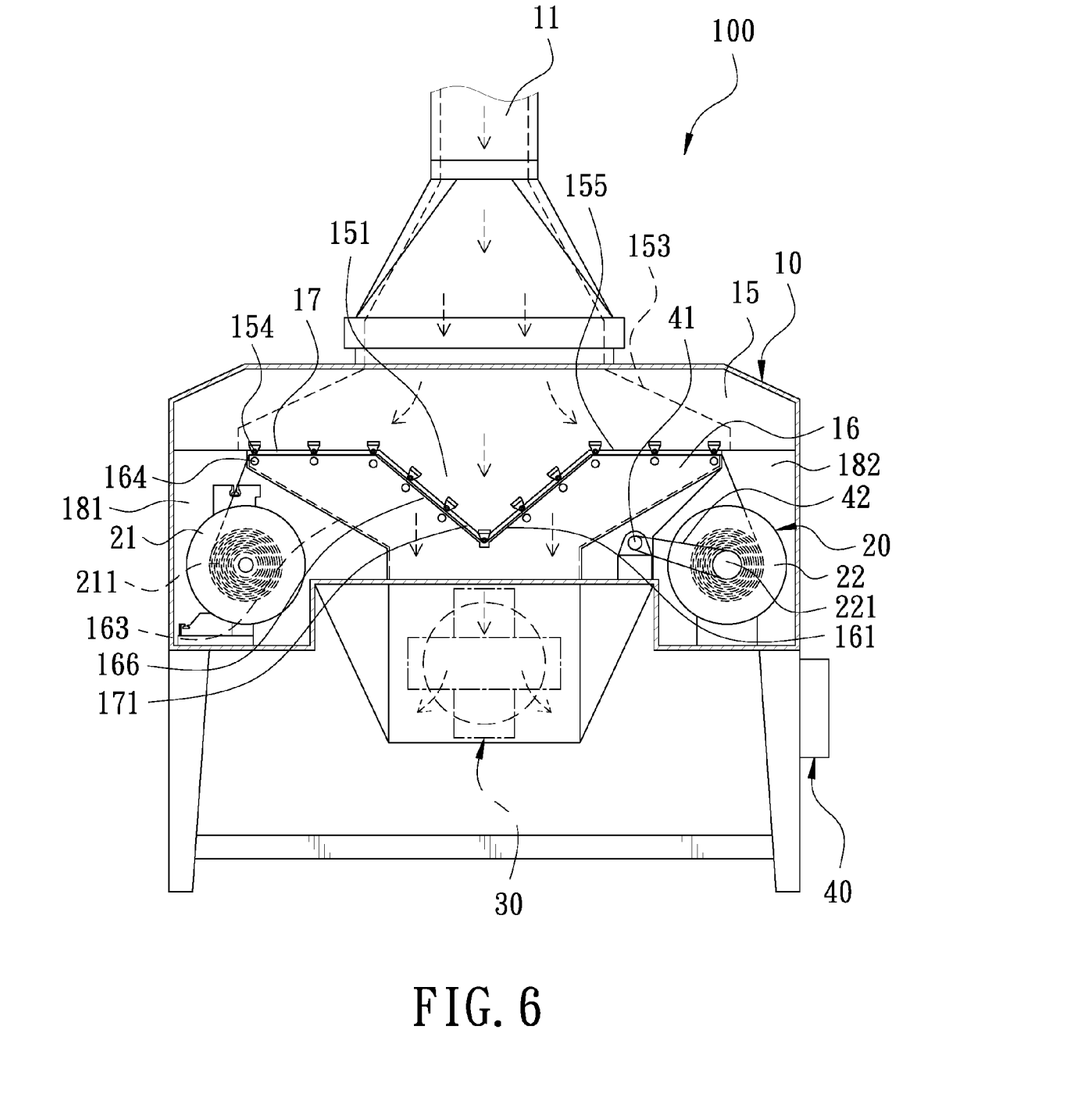
FIG. 6 is a schematic view of the preferred embodiment of the smoke filter in use in the present invention, showing a filtration state of the smoke filter.

In using, referring to FIG. 6 that shows a filtration state of the smoke filter 100 and FIG. 7 that shows a state of the driving motor 41 rotating the paper winding seat 22, when carrying out electric welding, a user can operate the control device 40 to start the blower 30 to produce negative pressure attractive force by which smoke and ashes produced during electric welding operation will be sucked into the housing 10.

Simultaneously, the smoke and the ashes will get into the upper accommodating chamber 153 of the upper casing 15 through the air intake 11 of the housing 10 and then, pass through the filtration passage 17 and get into the lower accommodating chamber 163 of the lower casing 16 and lastly, the smoke and the ashes will be exhausted out of the exhaust opening 12 by the blower 30. Thus the structure that the top portion of the housing 10 adjacent to the air intake 11 is gradually expanded downward can function to lower wind velocity so that the interior of the housing 10 can form comparatively large air volume and filtration can be well-distributed. Further, when the smoke and the ashes pass through the filtration passage 17, the filtration cloth 211 transversely passing through the filtration passage 17 will filtrate out the smoke and the ashes, and the V-shaped bending section 171 of the filtration passage 17 is employed to increase the filtration area of the filtration cloth 211 and enhance smoothness of air circulation, thus able to elevate filtration efficiency and further diminish the size of the housing 10.

Moreover, a user can make use of the control device 40 to set up a time interval of starting the driving motors 41 for automatically controlling the driving motors 41 to start and operate for a period of time preset. The main function is to have the control device 40 timely actuating the second rotary shafts 164 and the paper winding seat 22 to rotate via the driving belts 42 to enable the paper winding seat 22 to wind the filtration cloth 211 having the smoke and the ashes stuck thereon. Simultaneously, the second rotary shafts 164 will actuate the paper conveying seat 21 to output the filtration cloth 211, letting the filtration cloth 211 at the location of the bending section 171 automatically kept in a better filtration state for insuring effect of air filtration.

Referring to FIGS. 3 and 4, since the control device 40 is provided with two driving motors 41 respectively positioned at one side of the lower casing 16, and one of the two driving motors 41 is connected with the rotary gear 221 of the paper winding seat 22 by means of a driving belt 42, and another driving motor 41 is connected with the gears 165 by another driving belt 42; therefore, when a user makes use of the control device 40 to start the motors 41, referring to FIG. 5 and FIG. 7, one of the two driving motors 41 will drive the gears 165 to rotate by means of the driving belt 42 and meanwhile, the gears 165 will actuate the second rotary shafts 164 to roll for conveying the filtration cloth of the roll of filtration cloth 211 on the paper conveying seat 21. At this time, another driving motor 41 will drive the driving belt 42 to rotate and actuate the rotary gear 221 to make the paper winding seat 22 rotate for winding the filtration cloth 211. In this preferred embodiment, the second rotary shafts 164 are provided separately in order to lessen the contact area and the frictional force of the filtration cloth 211, and the second ventilating net racks 162 can function to support the filtration cloth 211.

FIGS. 2 and 3 show that the paper conveying seat 21 and the paper winding seat 22 of this invention are respectively and independently provided at two sides of the lower casing 16; therefore, if necessary, a user can open the door planks 14 of the housing 10 to have the paper conveying seat 21 or the paper winding seat 22 replaced with a new one, or remove out the filtration cloth 211, facilitating the user to replace the filtration cloth 211. Compared with the whole structure of the conventional air filter, the smoke filter 100 of this invention is simple in structure and able to carry out filtration automatically and has a larger filtration area and higher filtration efficiency and further is convenient for a user to remove and replace the filtration cloth.

In addition, the control device 40 of the smoke filter 100 of this invention is installed at an outer side of the housing 10, and the gears 165 and the driving motors 41 are respectively positioned at one side of the lower casing 16; therefore, when the control device 40 gets out of order, a user can open the door planks 14 to carry out maintenance in accordance with malfunctioned parts of the smoke filter 100. Thus, the smoke filter 100 of this invention is convenient in operation and maintenance.

As can be understood from the above description, this invention has the following characteristics and achievable expected efficacy:

1. The smoke filter 100 of this invention is provided with the blower 30 able to have the smoke and the ashes that are produced by electric welding sucked into the housing 10, and the filtration cloth 211 able to filtrate out the smoke and the ashes, thus achieving effect of causing no pollution during electric welding. Further, since the filtration cloth of the paper conveying seat 21 passes through the bending section 171 of the filtration passage 17; therefore, the bending section 171 has functions of increasing the filtration area of the filtration cloth, enhancing filtration efficiency and diminishing the size of the housing. Furthermore, the control device 40 has a timing function, able to timely rotate the paper winding seat 22 to enable the filtration cloth positioned in the filtration passage 17 to be automatically kept in a better filtration condition for maintaining effect of steady filtrating out the smoke and the ashes. Thus, the smoke filter 100 of this invention has advantages of being able to carry out filtration automatically and having larger filtration area and higher filtration efficiency.

2. The paper conveying seat 21 and the paper winding seat 22 of the smoke filter of this invention are respectively and independently provided at the two sides of the lower casing 16 so that a user is able to have the paper conveying seat 21 and the paper winding seat 22 respectively disengaged and removed from the housing 10 for replacing the filtration cloth 211 or detaching the paper winding seat 22, and the control device 40 is secured at the outer side of the housing 10 for facilitating operation and maintenance of the control device 40. Thus, compared with the conventional air filter, the smoke filter of this invention is simple in structure and convenient in subsequent maintenance and in detachment or replacement of the filtration cloth.

While the preferred embodiment of the invention has been described above, it will be recognized and understood that various modifications may be made therein and the appended claims are intended to cover all such modifications that may fall within the spirit and scope of the invention.

What is claimed is:

1. A smoke filter comprising:
a housing, said housing consisting of an upper casing and a lower casing, said upper casing formed therein with an upper accommodating chamber, said upper casing having a topside longitudinally provided with an air intake, said upper casing having a bottom side longitudinally bored with a first opening, said lower casing having an accommodating chamber formed therein, said lower casing having a topside longitudinally bored with a second opening corresponding to said first opening, said lower casing having one side transversely provided with an exhaust opening, said upper casing and said lower casing able to be mutually covered and combined into one, said upper accommodating chamber communicating with said lower accommodating chamber via said first opening and said second opening, a transverse filtration passage provided between said upper casing and said lower casing of said housing, said filtration passage stretching across said first opening and said second opening, said upper casing having a bottom side formed with a projecting portion facing said lower casing, said lower casing formed with a recessed portion corresponding with said projecting portion, said filtration passage formed into a bending section at the location of both said projecting portion and said recessed portion;

a replaceable filtration device consisting of a paper conveying seat and a paper winding seat, said paper conveying seat provided at an outer side of one side of said lower accommodating chamber of said lower casing, said paper winding seat positioned at an outer side of another side of said lower accommodating chamber of said lower casing, said paper conveying seat fitted thereon with a roll of filtration cloth, said filtration cloth having one end passing through said filtration passage between said upper casing and said lower casing and connected to said paper winding seat;

a blower installed at a location of said exhaust opening of said lower casing; and a control device set at a location of said exhaust opening of said lower casing; and a control device fixed at one side of said housing and connected with said blower, said control device provided with at least one driving motor, said driving motor connected with said paper winding seat for turning said paper winding seat.

2. The smoke filter as claimed in claim 1, wherein said upper casing has a bottom side provided with a plurality of first ventilating net racks, and said lower casing has a topside provided with a plurality of second ventilating net racks corresponding with said first ventilating net racks, said filtration passage positioned between said first ventilating net racks and said second ventilating net racks.

3. The smoke filter as claimed in claim 1, wherein said bending section of said filtration passage is V-shaped.

4. The smoke filter as claimed in claim 1, wherein said upper casing has a bottom side pivotally disposed with a plurality of first rotary shafts, said first rotary shafts being spaced apart, and said lower casing having a topside disposed with a plurality of second rotary shafts corresponding to said first rotary shafts.

5. The smoke filter as claimed in claim 2, wherein said upper casing has a bottom side pivotally provided with a plurality of first rotary shafts, and said first rotary shafts and said first ventilating net racks are arranged interposing one another, said lower casing having a topside provided with a plurality of second rotary shafts corresponding with said first rotary shafts, said second rotary shafts and said second ventilating net racks arranged in stagger.

6. The smoke filter as claimed in claim 5, wherein said lower casing has an outer side fixed with a plurality of gears, said gears respectively and correspondingly connected with one end of said second rotary shafts, said gears connected with said driving motor by a driving belt.

7. The smoke filter as claimed in claim 1, wherein said housing has peripheral sides respectively disposed with a plurality of openings at locations corresponding to said paper conveying seat and said paper winding seat, said openings of said housing respectively and pivotally assembled with a door plank.

8. The smoke filter as claimed in claim 1, wherein said upper accommodating chamber of said upper casing is gradually expanded from said air intake toward said first opening.

9. The smoke filter as claimed in claim 1, wherein said lower accommodating chamber of said lower casing has two transverse sides respectively provided with a side chamber respectively for receiving said paper conveying seat and said paper winding seat, said side chambers respectively formed with plurality openings, said openings respectively and pivotally fixed with a door plank.

10. The smoke filter as claimed in claim 1, wherein said lower accommodating chamber of said lower casing is gradually contracted from said second opening toward said exhaust opening.

\* \* \* \* \*